United States Patent
Luft et al.

(10) Patent No.: US 7,883,064 B2
(45) Date of Patent: Feb. 8, 2011

(54) MOUNTING BRACKET FOR A VEHICLE BACKUP CAMERA

(75) Inventors: Christopher A. Luft, Deltona, FL (US); Nick Soudas, Lake Mary, FL (US); Peter Dodridge, Orlando, FL (US)

(73) Assignee: Audiovox Corporation, Hauppauge, NY (US)

( * ) Notice: Subject to any disclaimer, the term of this patent is extended or adjusted under 35 U.S.C. 154(b) by 408 days.

(21) Appl. No.: 11/967,538

(22) Filed: Dec. 31, 2007

(65) Prior Publication Data

US 2009/0166488 A1    Jul. 2, 2009

(51) Int. Cl.
*F16M 11/00* (2006.01)
*A47G 1/10* (2006.01)
*A47B 96/06* (2006.01)
*A47F 5/00* (2006.01)
*A47F 5/08* (2006.01)
*A47H 1/10* (2006.01)
*E04G 3/00* (2006.01)
*B60Q 1/00* (2006.01)
*G08G 1/00* (2006.01)
*G08G 1/16* (2006.01)

(52) U.S. Cl. .............. 248/200; 248/316.1; 248/205.1; 248/309.1; 340/435; 340/932.2; 340/436; 340/901; 340/903; 340/933; 340/425.5; 396/419; 396/429; 40/209

(58) Field of Classification Search .......... 248/316.1, 248/205.1, 200, 309.1, 222.11; 340/435, 340/932.2, 436, 901, 902, 903, 933, 425.5; 640/937; 396/419, 429; 40/209
See application file for complete search history.

(56) References Cited

U.S. PATENT DOCUMENTS

| | | | |
|---|---|---|---|
| 5,838,228 A * | 11/1998 | Clark | 340/436 |
| 6,273,378 B1 * | 8/2001 | Fu et al. | 248/222.11 |
| 6,433,680 B1 * | 8/2002 | Ho | 340/435 |
| 7,001,033 B1 * | 2/2006 | Olsen et al. | 359/869 |
| 7,005,974 B2 | 2/2006 | McMahon et al. | |
| 7,511,607 B2 * | 3/2009 | Hubbard et al. | 340/435 |
| 2002/0180597 A1 * | 12/2002 | Flick | 340/436 |
| 2003/0147250 A1 * | 8/2003 | Grant | 362/497 |
| 2006/0257136 A1 * | 11/2006 | Son | 396/419 |
| 2007/0080585 A1 | 4/2007 | Lyu | |
| 2007/0093293 A1 * | 4/2007 | Osnato | 463/36 |
| 2007/0171032 A1 | 7/2007 | Dayan et al. | |
| 2009/0153663 A1 * | 6/2009 | Ramos | 348/148 |

OTHER PUBLICATIONS

International Search Report dated Mar. 19, 2009 in corresponding PCT/US08/88142.

* cited by examiner

*Primary Examiner*—Terrell Mckinnon
*Assistant Examiner*—Christopher Garft
(74) *Attorney, Agent, or Firm*—F. Chau & Associates, LLC

(57) ABSTRACT

A mounting bracket for a vehicle backup camera, including: a lengthwise portion; and a camera mounting portion connected to the lengthwise portion, the camera mounting portion including a protrusion, the protrusion forming a gap between the camera mounting portion and the lengthwise portion so that the lengthwise portion can be mounted behind a license plate of a vehicle and a camera can be suspended by the camera mounting portion for viewing a rear of the vehicle when the vehicle is in reverse.

13 Claims, 5 Drawing Sheets

MOUNTING BRACKET FOR A VEHICLE BACKUP CAMERA

BACKGROUND OF THE INVENTION

1. Technical Field

The present invention relates to vehicle backup cameras, and more particularly, to a mounting bracket for a vehicle backup camera.

2. Discussion of the Related Art

A backup camera system, such as those found in many SUVs, minivans and luxury vehicles, shows a driver what is behind them as they are reversing and displays it on the vehicle dashboard LCD so that the driver can avoid accidents.

For vehicles that do not have a built-in backup camera system, aftermarket backup camera systems, i.e., those systems designed to be installed into a vehicle after the vehicle has been sold to a consumer, are now widely available. These systems generally include a camera that is to be mounted onto the rear of a vehicle and a display device that is to be mounted in the interior of the vehicle.

In many aftermarket systems, the camera is integrated with a license plate frame or with a horizontal bracket that is mounted in front of the vehicle license plate. Such cameras, however, can obstruct portions of the license plate that must be visible such as a registration sticker, State or County name, which is prohibited throughout the majority of the United States.

Accordingly, there is a need for a vehicle backup camera that does not obstruct portions of a license plate that must be legally visible.

SUMMARY OF THE INVENTION

In an exemplary embodiment of the present invention, a mounting bracket for a vehicle backup camera, comprises: a lengthwise portion; and a camera mounting portion connected to the lengthwise portion, the camera mounting portion including a protrusion, the protrusion forming a gap between the camera mounting portion and the lengthwise portion so that the lengthwise portion can be mounted behind a license plate of a vehicle and a camera can be suspended by the camera mounting portion for viewing a rear of the vehicle when the vehicle is in reverse.

The lengthwise portion includes a pair of mounting holes. The pair of mounting holes are spaced apart from each other so that they can be aligned with a corresponding pair of mounting holes on the license plate. The pair of mounting holes are configured to permit longitudinal position adjustment of the camera relative to the license plate.

The camera mounting portion includes a pair of mounting holes. The camera is secured to the camera mounting portion by inserting a screw into each of the mounting holes and tightening the screws. A viewing angle of the camera is adjusted by untightening the screws, moving the camera to a desired position and retightening the screws.

In an exemplary embodiment of the present invention, a backup camera system for a vehicle, comprises: a mounting bracket having a lengthwise portion including a pair of mounting holes and a camera mounting portion connected to the lengthwise portion, the camera mounting portion including a protrusion, the protrusion forming a gap between the camera mounting portion and the lengthwise portion so that the lengthwise portion can be mounted behind a license plate of a vehicle and a camera can be suspended by the camera mounting portion for capturing images of a rear of the vehicle when the vehicle is in reverse; and a display device for displaying images captured by the camera.

The mounting bracket is secured between the license plate and the rear of the vehicle by inserting a screw into each mounting hole of the license plate and through corresponding mounting holes of the lengthwise portion and then tightening the screws. When the mounting bracket is secured between the license plate and the rear of the vehicle the camera is suspended over a top center portion of the license plate.

The camera includes a transmitter for transmitting the captured images to the display device and the display device includes a receiver for receiving the transmitted images.

The system further comprises an audio/video line for connecting to the camera and the display device so that the images captured by the camera can be sent to the display device.

The camera and display device both include a power line for connecting to vehicle power.

In an exemplary embodiment of the present invention, a mounting bracket for a vehicle backup camera, comprises: a lengthwise portion having a pair of mounting holes that are spaced apart so that they can be aligned with a corresponding pair of mounting holes on a standard United States license plate; and a camera mounting portion connected to the lengthwise portion, the camera mounting portion having a protrusion extending from the lengthwise portion, the protrusion forming a gap between the lengthwise portion and the camera mounting portion so that the lengthwise portion can be mounted behind a license plate of a vehicle and a camera can be suspended by the camera mounting portion for viewing a rear of the vehicle when the vehicle is in reverse, wherein if the mounting bracket is secured between the license plate and the rear of the vehicle in a first longitudinal position the camera does not obstruct the license plate, and if the mounting bracket is secured between the license plate and the rear of the vehicle in a second longitudinal position the camera obstructs a portion of the license plate.

The mounting holes of the lengthwise portion have an oval or rectangular shape so that the mounting bracket can be situated in the first and second longitudinal positions.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
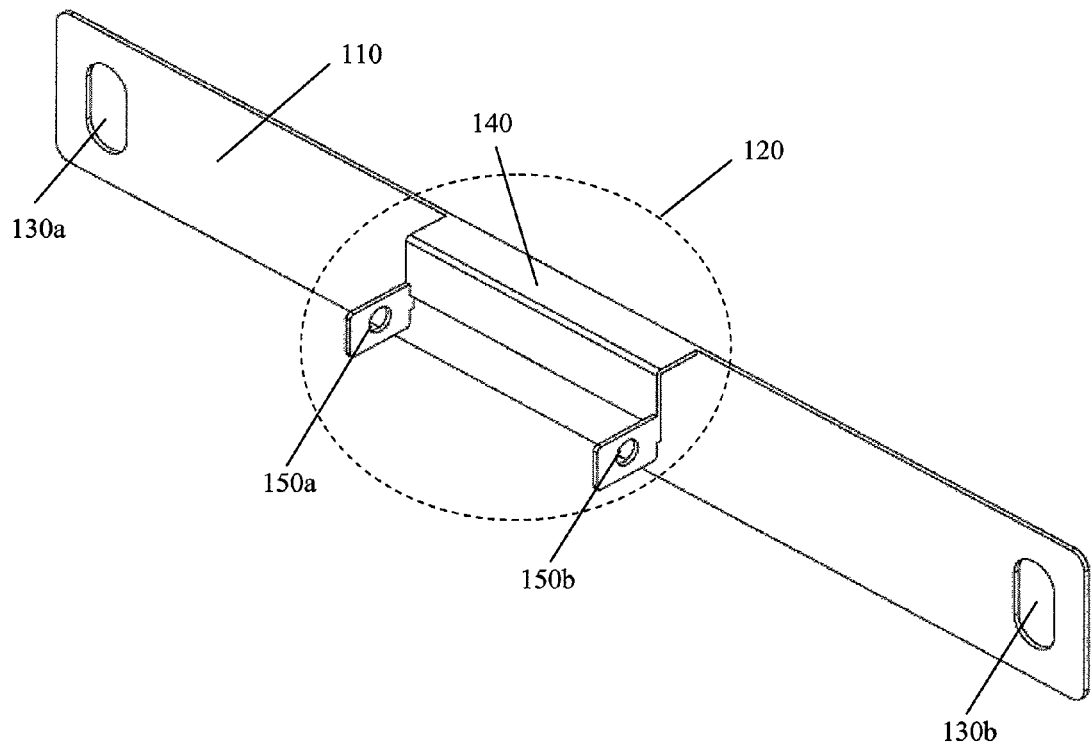
FIG. 1 is a perspective view of a mounting bracket for a vehicle backup camera according to an exemplary embodiment of the present invention.
Figure 2:
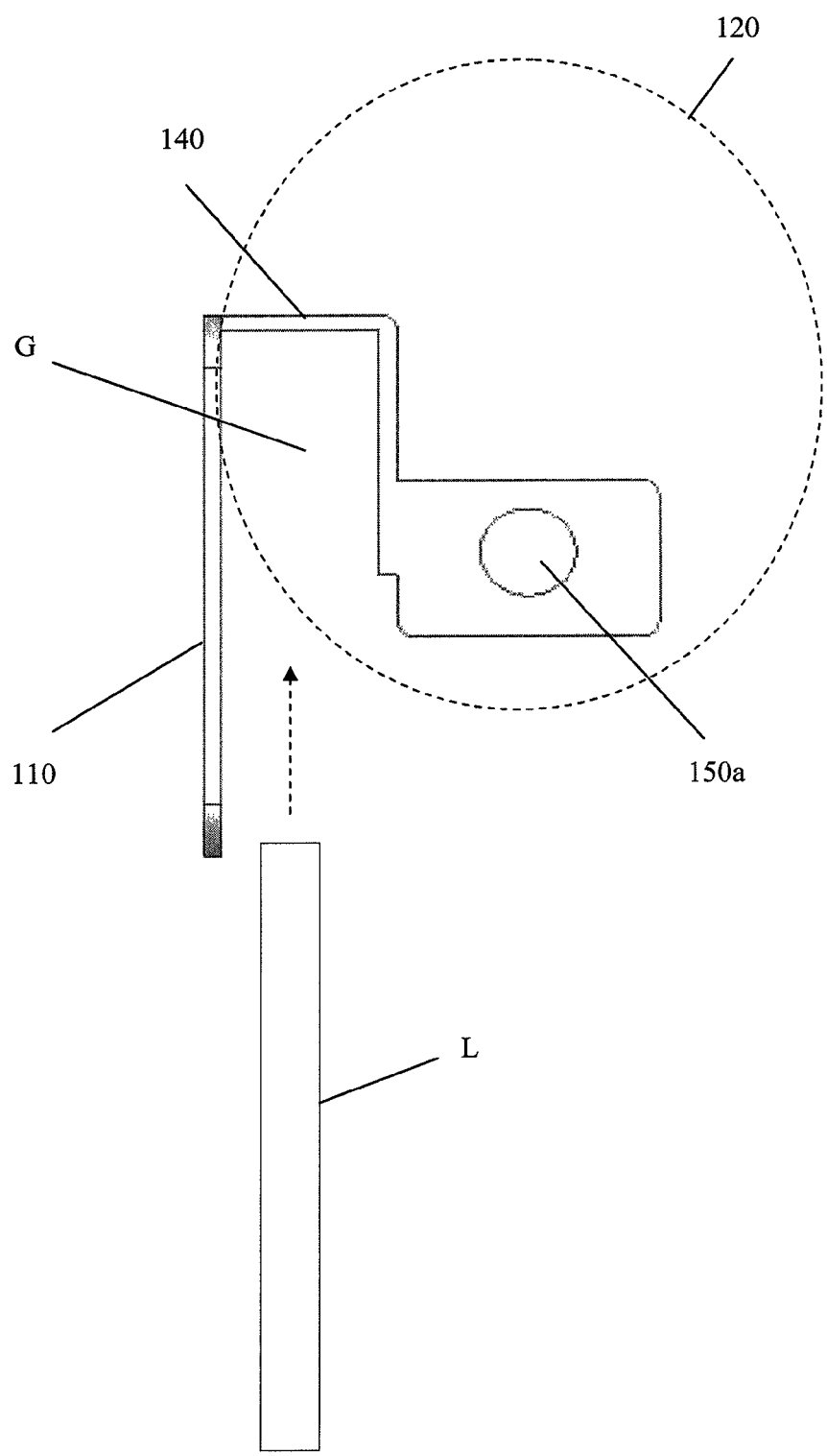
FIG. 2 is a side view of the mounting bracket of FIG. 1.

FIG. 1 is a perspective view of a mounting bracket for a vehicle backup camera according to an exemplary embodiment of the present invention. FIG. 2 is a side view of the mounting bracket of FIG. 1.

As shown in FIGS. 1 and 2, the mounting bracket includes a lengthwise portion 110 and a camera mounting portion 120.

The lengthwise portion 110, which is approximately 7 13/16 inches in length, includes a pair of mounting holes 130a,b. The mounting holes 130a,b enable the mounting bracket to be mounted to the rear of a vehicle behind a license plate L. For this purpose, the mounting holes 130a,b are spaced approximately 7 inches apart, from center to center, so that they can be aligned with a pair of mounting holes on a standard United States license plate.

The camera mounting portion 120 includes a protrusion 140 at approximately 2 15/16 inches in from each end of the lengthwise portion 110 that forms a gap G between the camera mounting portion 120 and the lengthwise portion 110. The gap G is sufficiently wide so that a portion of the camera mounting portion 120 that extends downward does not come into contact with the license plate L (although this may not always be the case). The camera mounting portion 120 also includes a pair of holes 150a,b that enable a camera to be mounted thereto. The camera is mounted and its position is fixed by inserting a screw into each of the holes 150a,b and then tightening the screws. For this purpose the camera may include threaded holes for receiving the screws. The angle of the camera can be adjusted prior to tightening the screws.

Figure 3:
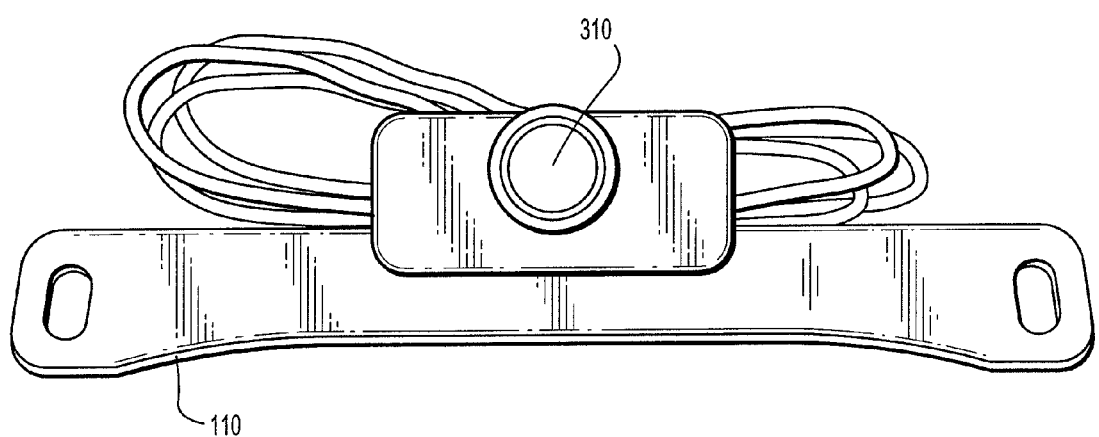
FIG. 3 illustrates a camera mounted on a mounting bracket according to an exemplary embodiment of the present invention.

The mounting bracket, which may be made of metal or any suitable material, is designed to hold a camera for viewing the rear of a vehicle when the vehicle is in reverse as a safety measure. An example of a mounting bracket with a camera 310 mounted thereon is shown in FIG. 3.

Figure 4:
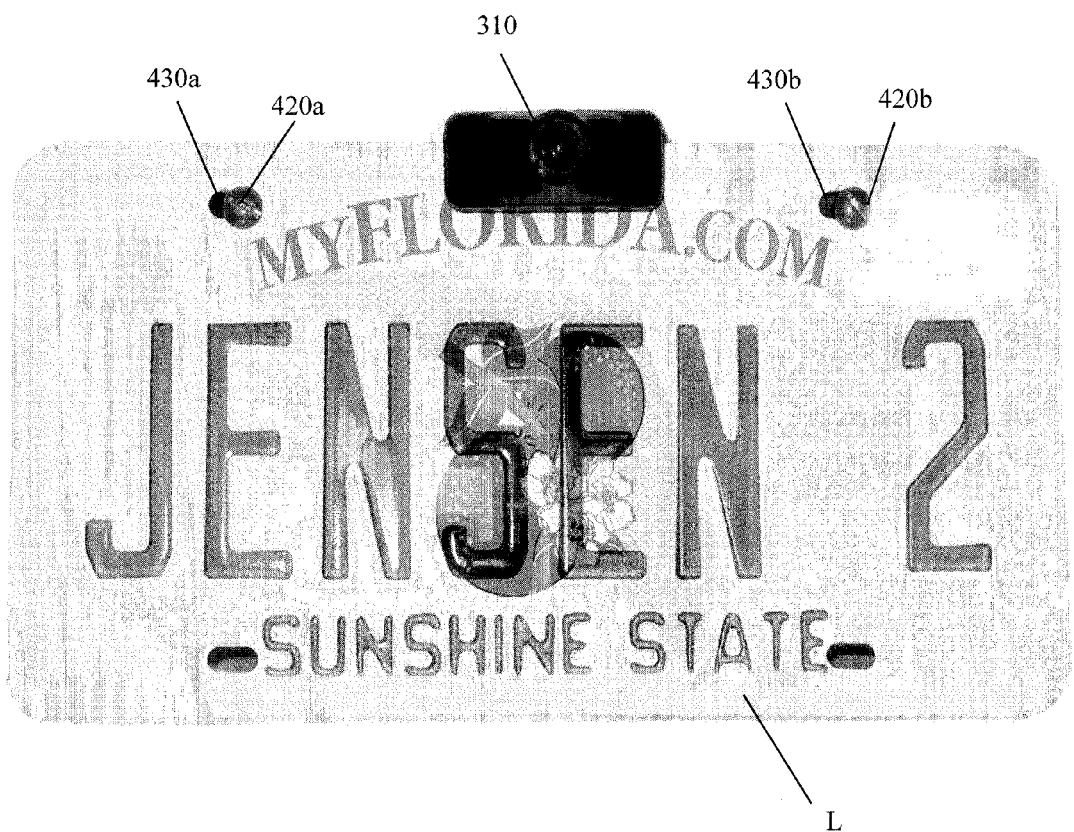
FIG. 4 illustrates the mounting bracket and camera shown in FIG. 3 with the mounting bracket mounted behind a vehicle license plate and the camera suspended over a top center portion of the license plate.

More specifically, the mounting bracket is designed to mount behind a vehicle license plate L and suspend the camera 310 over the top center portion of the license plate L, as shown in FIG. 4. In FIG. 4, the mounting bracket is secured between the license plate L and the rear of a vehicle (not shown) by inserting a screw (e.g., existing license plate screws 420a,b) into each mounting hole 430a,b on the license plate L and through the corresponding mounting holes 130a,b on the mounting bracket and then tightening the screws 420a,b. In addition to being existing license plate screws, the screws 420a,b may be theft proof screws to prevent the mounting bracket and camera 310 from being easily stolen.

As shown in FIG. 4, the camera 310 obstructs a portion of the license plate L. Although this may be legal in many of the United States (assuming the camera 310 is not blocking a portion of the license plate L that must be visible such as a registration sticker, State or County name), if the State requires that absolutely no portion of the license plate L be obstructed, the mounting bracket can be raised so that the camera 310 does not obstruct the license plate L. This is possible because the mounting holes 130a,b have an oval shape (or any other suitable shape, e.g., rectangular) to permit longitudinal position adjustment of the camera 310 relative to the license plate L.

Referring to FIGS. 1-4 it is seen that the angle of the camera 310 can be easily adjusted (by simply using its screws) after the mounting bracket is secured between the license plate L and the rear of a vehicle. In addition, by using the screws to adjust the angle of the camera 310 up or down to compensate for the height of the license plate L, the area directly behind the vehicle can be viewed without having to use any other hardware or mounting shims to obtain the desired angle. Further, the gap G formed by the protrusion 140 may be sufficiently wide so that the camera 310 may never come into direct contact with the license plate L even when the camera 310 is angled as far downward as possible.

Figure 5:
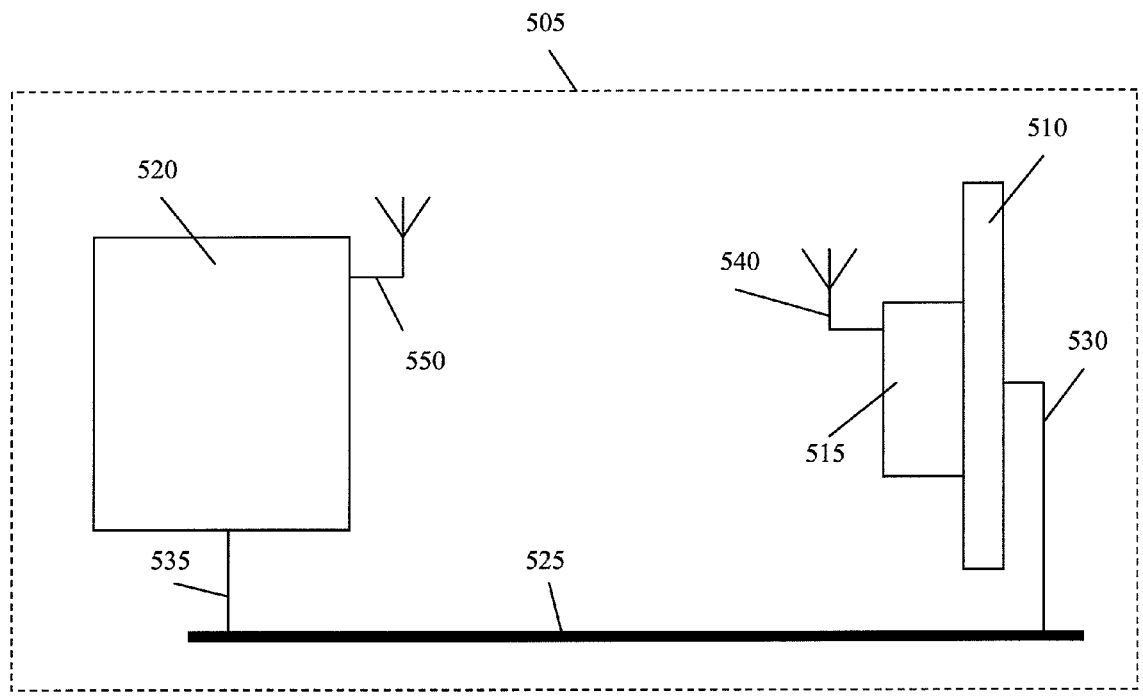
FIG. 5 is a backup camera system for a vehicle according to an exemplary embodiment of the present invention.
Figure 5:
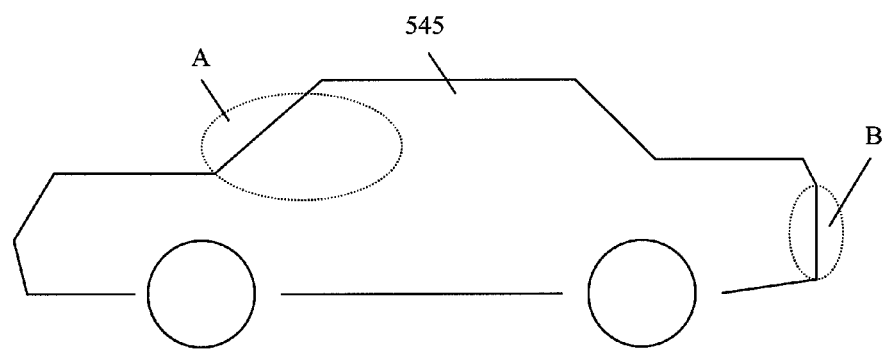

FIG. 5 is a backup camera system for a vehicle according to an exemplary embodiment of the present invention.

As shown in FIG. 5, a backup camera system 505 includes a mounting bracket 510 with a camera 515 mounted thereon and a display device 520. The mounting bracket 510 and camera 515 are the same as or similar to the mounting bracket and camera 310 described above with reference to FIGS. 1-4. The display device 520 may be an LCD monitor that mounts on a vehicle dashboard or a rear view mirror with an integrated TFT monitor, both of which are located in an inner portion A of a vehicle 545.

The mounting bracket 510 is mounted on a rear portion B of the vehicle 545 as described above with reference to FIGS. 1-4. The camera 515 is connected to the vehicle power system 525 via a power line 530. The display device 520 is connected to the vehicle power system 525 via a power line 535. The camera 515 is powered by the vehicle back up lights and the display device 520 is powered by a cigarette lighter outlet. The camera 515 and display device 520 are automatically activated when the vehicle 545 is put in reverse.

The camera 515 may wirelessly transmit image signals to the display device 520. This is accomplished by including a transmitter 540 in the camera 515 and a receiver 550 in the display device 520. The camera 515 may also transmit image signals to the display device 520 through audio/video lines (for illustrative purposes the audio/video lines are indicated by the lines also identifying the power lines 530/535 or by all the lines identifying the power lines 525-535) coupled to the vehicle wiring/data bus (for illustrative purposes the vehicle wiring/data bus are indicated by the line also identifying the power line 525).

It is to be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A mounting bracket for a vehicle backup camera, comprising:
    a lengthwise portion; and
    a camera mounting portion connected to the lengthwise portion, the camera mounting portion including a protrusion, the protrusion forming a gap between the camera mounting portion and the lengthwise portion, wherein the gap allows a license plate to be positioned in the gap so that the lengthwise portion can be mounted between the license plate and a rear of a vehicle and a camera can be suspended by the camera mounting portion for viewing behind the vehicle when the vehicle is in reverse, and wherein the camera mounting portion further includes a pair of brackets that protrude away from the gap, each of the brackets including an aperture for positioning a fastener therethrough to permit adjustment of the camera's viewing angle, and wherein a first end of the protrusion is perpendicularly connected to an upper portion of the lengthwise portion, a second end of the protrusion is perpendicularly connected to an upper portion of a backplate, the backplate extends downward from its connection to the second end of the protrusion to form the gap, a lower portion of the backplate is perpendicularly connected to the brackets, and the brackets extend away from the lower portion of the backplate and do not touch the upper portion of the backplate.

2. The bracket of claim 1, wherein the lengthwise portion includes a pair of mounting holes.

3. The bracket of claim 2, wherein the pair of mounting holes are spaced apart from each other so that they can be aligned with a corresponding pair of mounting holes on the license plate.

4. The bracket of claim 2, wherein the pair of mounting holes are configured to permit longitudinal position adjustment of the camera relative to the license plate.

5. A backup camera system for a vehicle, comprising:
a mounting bracket having a lengthwise portion including a pair of mounting holes and a camera mounting portion connected to the lengthwise portion, the camera mounting portion including a protrusion, the protrusion forming a gap between the camera mounting portion and the lengthwise portion, wherein the gap allows a license plate to be positioned in the gap so that the lengthwise portion can be mounted between the license plate and a rear of a vehicle and a camera can be suspended by the camera mounting portion for capturing images behind the vehicle when the vehicle is in reverse; and
a display device for displaying images captured by the camera,
wherein the camera mounting portion further includes a pair of brackets that protrude away from the gap, each of the brackets including an aperture for positioning a fastener therethrough to permit adjustment of the camera's viewing angle, and
wherein a first end of the protrusion is perpendicularly connected to an upper portion of the lengthwise portion, a second end of the protrusion is perpendicularly connected to an upper portion of a backplate, the backplate extends downward from its connection to the second end of the protrusion to form the gap, a lower portion of the backplate is perpendicularly connected to the brackets and the brackets extend away from the lower portion of the backplate and do not touch the upper portion of the backplate.

6. The system of claim 5, wherein the mounting bracket is secured between the license plate and the rear of the vehicle by inserting a screw into each mounting hole of the license plate and through corresponding mounting holes of the lengthwise portion and then tightening the screws.

7. The system of claim 6, wherein when the mounting bracket is secured between the license plate and the rear of the vehicle the camera is suspended over a top center portion of the license plate.

8. The system of claim 5, wherein the camera includes a transmitter for transmitting the captured images to the display device and the display device includes a receiver for receiving the transmitted images.

9. The system of claim 5, further comprising:
an audio/video line for connecting to the camera and the display device so that the images captured by the camera can be sent to the display device.

10. The system of claim 5, wherein the camera and display device both include a power line for connecting to vehicle power.

11. A mounting bracket for a vehicle backup camera, comprising:
a lengthwise portion having a pair of mounting holes that are spaced apart so that they can be aligned with a corresponding pair of mounting holes on a standard United States license plate; and
a camera mounting portion connected to the lengthwise portion, the camera mounting portion having a protrusion extending from the lengthwise portion, the protrusion forming a gap between the lengthwise portion and the camera mounting portion, wherein the gap allows a license plate to be positioned in the gap so that the lengthwise portion can be mounted between the license plate and a rear of a vehicle and a camera can be suspended by the camera mounting portion for viewing behind the vehicle when the vehicle is in reverse,
wherein if the mounting bracket is secured between the license plate and the rear of the vehicle in a first longitudinal position the camera does not obstruct the license plate, and if the mounting bracket is secured between the license plate and the rear of the vehicle in a second longitudinal position the camera obstructs a portion of the license plate,
wherein the camera mounting portion further includes a pair of brackets that protrude away from the gap, each of the brackets including an aperture for positioning a fastener therethrough to permit adjustment of the camera's viewing angle, and
wherein a first end of the protrusion is perpendicularly connected to an upper portion of the lengthwise portion, a second end of the protrusion is perpendicularly connected to an upper portion of a backplate, and the backplate extends downward from its connection to the second end of the protrusion to form the gap.

12. The bracket of claim 11, wherein the mounting holes of the lengthwise portion have an oval or rectangular shape so that the mounting bracket can be situated in the first and second longitudinal positions.

13. The bracket of claim 1, wherein the camera's viewing angle of the entirety of the rear of the vehicle is at least 180°.

* * * * *